United States Patent
Lee et al.

(10) Patent No.: US 9,816,590 B2
(45) Date of Patent: Nov. 14, 2017

(54) PLANETARY GEAR TRAIN OF AUTOMATIC TRANSMISSION FOR A VEHICLE

(71) Applicant: Hyundai Motor Company, Seoul (KR)

(72) Inventors: KyeongHun Lee, Seoul (KR); Chang Wook Lee, Suwon-si (KR); JongSool Park, Hwaseong-si (KR); Sueng Ho Lee, Seoul (KR); Dong Hwan Hwang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 92 days.

(21) Appl. No.: 14/887,058

(22) Filed: Oct. 19, 2015

(65) Prior Publication Data

US 2016/0363192 A1 Dec. 15, 2016

(30) Foreign Application Priority Data

Jun. 15, 2015 (KR) .......................... 10-2015-0084256

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2048* (2013.01)

(58) Field of Classification Search
None
See application file for complete search history.

(56) References Cited

U.S. PATENT DOCUMENTS

| 7,993,237 B2 | 8/2011 | Wittkopp et al. |
| 8,517,886 B2 * | 8/2013 | Seo .................... F16H 3/663 475/288 |
| 8,939,863 B2 | 1/2015 | Hart et al. |

FOREIGN PATENT DOCUMENTS

| JP | 2005-172123 A | 6/2005 |
| JP | 2009-299763 A | 12/2009 |
| JP | 5479518 B2 | 4/2014 |
| KR | 10-2013-0031456 A | 3/2013 |
| KR | 10-2013-0031457 A | 3/2013 |

* cited by examiner

*Primary Examiner* — Erin D Bishop
(74) *Attorney, Agent, or Firm* — Morgan, Lewis & Bockius LLP

(57) ABSTRACT

A planetary gear train of an automatic transmission includes an input shaft, an output shaft, and first to fourth planetary gear sets respectively including first to third, fourth to sixth, seventh to ninth, and tenth to twelfth rotating elements, wherein the input shaft and the second rotating element, the output shaft and the eleventh rotating element, the first and sixth rotating elements, the first and eighth rotating elements, the seventh and eleventh rotating elements, and the ninth and tenth rotating elements are fixedly interconnected, and the output shaft is selectively connected with the third rotating element, and achieves ten forward speeds and one reverse speed by selectively operating three control elements among seven control elements.

17 Claims, 2 Drawing Sheets

FIG. 2

| | Control element | | | | | | Gear ratio | Step ratio | Entire gear ratio |
|---|---|---|---|---|---|---|---|---|---|
| | B1 | B2 | B3 | C1 | C2 | C3 | C4 | | | |
| D1 | | | ● | | ● | | ● | 6.278 | 1.63 | 9.465 |
| D2 | | | ● | | | | ● | 3.848 | 1.39 | |
| D3 | | | ● | | ● | ● | | 2.761 | 1.45 | |
| D4 | ● | | ● | | | ● | | 1.908 | 1.31 | |
| D5 | | | ● | ● | | ● | | 1.456 | 1.23 | |
| D6 | ● | | | ● | | ● | | 1.185 | 1.19 | |
| D7 | | | | ● | | ● | ● | 1.000 | 1.19 | |
| D8 | ● | ● | | ● | | | ● | 0.840 | 1.13 | |
| D9 | | ● | | ● | | | | 0.741 | 1.12 | |
| D10 | | ● | ● | | ● | | | 0.664 | | |
| REV | | ● | | | ● | | | -6.175 | | |

PLANETARY GEAR TRAIN OF AUTOMATIC TRANSMISSION FOR A VEHICLE

CROSS-REFERENCE TO RELATED APPLICATION

The present application claims priority to Korean Patent Application Number 10-2015-0084256 filed Jun. 15, 2015, the entire contents of which is incorporated herein for all purposes by this reference.

BACKGROUND OF THE INVENTION

Field of the Invention

The present invention relates to an automatic transmission for a vehicle, and more particularly, to a planetary gear train of an automatic transmission for a vehicle which implements forward at least 10-speed and increases an entire gear ratio by a minimum configuration to improve power transmission performance and fuel efficiency and secure linearity of step ratios between transmission stages.

Description of Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As a result, research into reduction of weight and enhancement of fuel efficiency through downsizing has been conducted in the case of an engine and research for simultaneously securing operability and fuel efficiency competitiveness through multiple speed stages has been conducted in the case of an automatic transmission.

However, in the automatic transmission, as the number of transmission speed stages increases, the number of internal components also increases, and as a result, the automatic transmission may be difficult to mount, the manufacturing cost and weight may be increased, and power transmission efficiency may be deteriorated.

Accordingly, development of a planetary gear train which may bring about maximum efficiency with a small number of components may be important in order to increase a fuel efficiency enhancement effect through the multiple speed stages.

In this aspect, in recent years, 8 and 9-speed automated transmissions tend to be implemented and the research and development of a planetary gear train capable of implementing more transmission steps has also been actively conducted.

However, improvement effect of fuel efficiency is not so good in case of 8-speed automated transmission, because an entire gear ratio is maintained in a level of 6.5~7.5.

Therefore, development of at least 9-speed high efficiency automatic transmission is required in that operation efficiency of an engine and drivability of a vehicle are deteriorated because linearity of step ratios between transmission stages can't be secured in case of enabling an entire gear ratio of an 8-speed automated transmission to be a level more than or equal to 9.0.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle which implements forward at least 10-speed and reverse 1-speed transmission steps with a minimum configuration, improves power transmission efficiency and fuel efficiency through increasing an entire gear ratio, and secures linearity of step ratios between transmission stages.

According to various aspects of the present invention, a planetary gear train of an automatic transmission for a vehicle may include an input shaft receiving rotary power of an engine, an output shaft outputting the rotary power with rotary speed changed, a first planetary gear set including a first, a second, and a third rotating element, a second planetary gear set including a fourth, a fifth, and a sixth rotating element, a third planetary gear set including a seventh, an eighth, and a ninth rotating element, a fourth planetary gear set including a tenth, a eleventh, and a twelfth rotating element, and seven control elements disposed between one of the rotating elements and another of the rotating elements or the input shaft, between one of the rotating elements and the output shaft, or between one of the rotating elements and a transmission housing, in which the input shaft may be directly connected with the second rotating element, the output shaft may be directly connected with the eleventh rotating element, the first rotating element may be directly connected with the sixth rotating element, the first rotating element may be directly connected with the eighth rotating element, the seventh rotating element may be directly connected with the eleventh rotating element, the ninth rotating element may be directly connected with the tenth rotating element, and the output shaft may be selectively connected with the third rotating element, and the planetary gear train may implement transmission steps of at least ten forward speeds and at least one reverse speed while three control elements operate among the seven control elements.

The fourth rotating element may be selectively connected with the transmission housing, the fifth rotating element may be selectively connected with the transmission housing, the twelfth rotating element may be selectively connected with the transmission housing, the input shaft may be selectively connected with the fourth rotating element and the fifth rotating element respectively, and the ninth rotating element may be selectively connected with the fifth rotating element.

The seven control elements may include a first clutch selectively connecting the output shaft and the third rotating element, a second clutch selectively connecting the input shaft and the fourth rotating element, a third clutch selectively connecting the input shaft and the fifth rotating element, a fourth clutch selectively connecting the ninth rotating element and the fifth rotating element, a first brake selectively connecting the fourth rotating element and the transmission housing, a second brake selectively connecting the fifth rotating element and the transmission housing, and a third brake selectively connecting the twelfth rotating element and the transmission housing.

The first, the second, and the third rotating element of the first planetary gear set may be a sun gear, a planetary carrier, and a ring gear respectively, the fourth, the fifth, and the sixth rotating element of the second planetary gear set are a sun gear, a planetary carrier, a ring gear respectively, the seventh, the eighth, and the ninth rotating element of the third planetary gear set are a sun gear, a planetary carrier, and a ring gear respectively, and the tenth, the eleventh, and the twelfth rotating element of the fourth planetary gear set are a sun gear, a planetary carrier, and a ring gear respectively.

According to various aspects of the present invention, a planetary gear train of an automatic transmission for a vehicle may include an input shaft receiving rotary power of an engine, an output shaft outputting the rotary power with rotary speed changed, a first planetary gear set including a first, a second, and a third rotating element, a second planetary gear set including a fourth, a fifth, and a sixth rotating element, a third planetary gear set including a seventh, an eighth, and a ninth rotating element, a fourth planetary gear set including a tenth, a eleventh, and a twelfth rotating element, seven control elements disposed between one of the rotating elements and another of the rotating elements or the input shaft, between one of the rotating elements and the output shaft, or between one of the rotating elements and a transmission housing, a first rotating shaft including the first rotating element, the sixth rotating element, and the eighth rotating element, a second rotating shaft including the second rotating element and directly connected with the input shaft, a third rotating shaft including the third rotating element, a fourth rotating shaft including the fourth rotating element and selectively connected with the second rotating shaft and the transmission housing, a fifth rotating shaft including the fifth rotating element and selectively connected with the second rotating shaft, a sixth rotating shaft including the seventh rotating element and the eleventh rotating element, directly connected with the output shaft, and selectively connected with the third rotating shaft, a seventh rotating shaft including the ninth rotating element and the tenth rotating element and selectively connected with the fifth rotating shaft, and an eighth rotating shaft including the twelfth rotating element and selectively connected with the transmission housing.

The first planetary gear set may be a single-pinion planetary gear set, the first rotating element may be a first sun gear, the second rotating element may be a first planetary carrier, and the third rotating element may be a first ring gear, the second planetary gear set may be a single-pinion planetary gear set, the fourth rotating element may be a second sun gear, the fifth rotating element may be a second planetary carrier, and the sixth rotating element may be a second ring gear, the third planetary gear set may be a single-pinion planetary gear set, the seventh rotating element may be a third sun gear, the eighth rotating element may be a third planetary carrier, and the ninth rotating element may be a third ring gear, and the fourth planetary gear set may be a single-pinion planetary gear set, the tenth rotating element may be a fourth sun gear, the eleventh rotating element may be a fourth planetary carrier, and the twelfth rotating element may be a fourth ring gear.

The four planetary gear sets may be disposed in an order of the second, the first, the third, and the fourth planetary gear set starting from an engine side.

Transmission stages implemented by selectively operating the six control elements may include a first forward transmission stage implemented by simultaneously operating the second and the fourth clutches and the third brake, a second forward transmission stage implemented by simultaneously operating the third and the fourth clutches and the third brake, a third forward transmission stage implemented by simultaneously operating the second and the third clutches and the third brake, a fourth forward transmission stage implemented by simultaneously operating the third clutches and the first and the third brakes, a fifth forward transmission stage implemented by simultaneously operating the first and the third clutches and the third brake, a sixth forward transmission stage implemented by simultaneously operating the first and the third clutches and the first brake, a seventh forward transmission stage implemented by simultaneously operating the first, the third, and the fourth clutches, an eighth forward transmission stage implemented by simultaneously operating the first and the fourth clutches and the second brake, a ninth forward transmission stage implemented by simultaneously operating the first clutch and the first and the second brakes, a tenth forward transmission stage implemented by simultaneously operating the first and the second clutches and the second brake, and a reverse transmission stage implemented by simultaneously operating the second clutch and the second and the third brakes.

According to various aspects of the present invention, a planetary gear train of an automatic transmission for a vehicle may include an input shaft receiving rotary power of an engine, an output shaft outputting the rotary power with rotary speed changed, a first planetary gear set including a first, a second, and a third rotating element, a second planetary gear set including a fourth, a fifth, and a sixth rotating element, a third planetary gear set including a seventh, an eighth, and a ninth rotating element, a fourth planetary gear set including a tenth, a eleventh, and a twelfth rotating element, a first rotating shaft including the first rotating element, the sixth rotating element, and the eighth rotating element, a second rotating shaft including the second rotating element and directly connected with the input shaft, a third rotating shaft including the third rotating element, a fourth rotating shaft including the fourth rotating element and selectively connected with the second rotating shaft and a transmission housing, a fifth rotating shaft including the fifth rotating element and selectively connected with the second rotating shaft, a sixth rotating shaft including the seventh rotating element and the eleventh rotating element, directly connected with the output shaft, and selectively connected with the third rotating shaft, a seventh rotating shaft including the ninth rotating element and the tenth rotating element and selectively connected with the fifth rotating shaft, an eighth rotating shaft including the twelfth rotating element and selectively connected with the transmission housing, a first clutch selectively connecting the third rotating shaft and the sixth rotating shaft, a second clutch selectively connecting the second rotating shaft and the fourth rotating shaft, a third clutch selectively connecting the second rotating shaft and the fifth rotating shaft, a fourth clutch selectively connecting the fifth rotating shaft and the seventh rotating shaft, a first brake selectively connecting the fourth rotating shaft with the transmission housing, a second brake selectively connecting the fifth rotating shaft with the transmission housing, and a third brake selectively connecting the eighth rotating shaft with the transmission housing.

According to various aspects of the present invention, a planetary gear train of an automatic transmission for a vehicle may include an input shaft receiving rotary power of an engine, an output shaft outputting the rotary power with rotary speed changed, a first planetary gear set, which may be a single-pinion planetary gear set, including a first sun gear, a first planetary carrier, and a first ring gear, a second planetary gear set, which may be a single-pinion planetary gear set, including a second sun gear, a second planetary carrier, and a second ring gear, a third planetary gear set, which may be a single-pinion planetary gear set, including a third sun gear, a third planetary carrier, and a third ring gear, a fourth planetary gear set, which may be a single-pinion planetary gear set, including a fourth sun gear, a fourth planetary carrier, and a fourth ring gear, a first rotating shaft including the first sun gear, the second ring gear, and the third planetary carrier, a second rotating shaft including the first planetary carrier and directly connected with the input shaft, a third rotating shaft including the first ring gear, a fourth rotating shaft including the second sun gear and selectively connected with the second rotating shaft and a transmission housing, a fifth rotating shaft including the second planetary carrier and selectively connected with the second rotating shaft, a sixth rotating shaft including the third sun gear and the fourth planetary carrier, directly connected with the output shaft, and selectively connected with the third rotating shaft, a seventh rotating shaft including the third ring gear and the fourth sun gear and selectively connected with the fifth rotating shaft, an eighth rotating shaft including the fourth ring gear and selectively connected with the transmission housing, and seven control elements disposed at portions selectively connecting the rotating shafts respectively or selectively connecting the rotating shafts and the transmission housing respectively.

The planetary gear train may further include a first clutch selectively connecting the first ring gear and the third sun gear, a second clutch selectively connecting the first planetary carrier and the second sun gear, a third clutch selectively connecting the first planetary carrier and the second planetary carrier, a fourth clutch selectively connecting the third ring gear and the second planetary carrier, a first brake selectively connecting the second sun gear with the transmission housing, a second brake selectively connecting the second planetary carrier with the transmission housing, and a third brake selectively connecting the fourth ring gear with the transmission housing.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of transmission steps of respective control elements applied to an exemplary planetary gear train according to the present invention.

Figure 1:
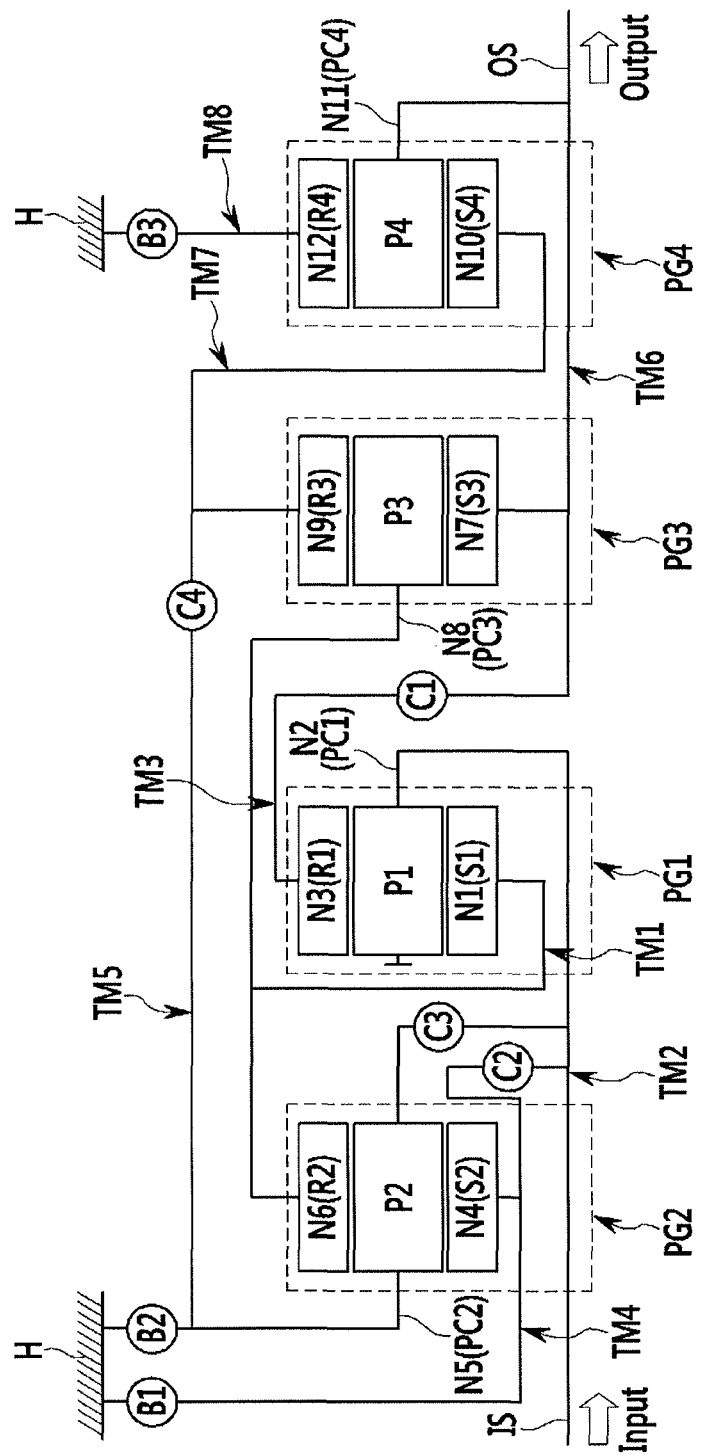
FIG. 1 is a schematic diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of an exemplary planetary gear train according to the present invention.

Referring to FIG. 1, the planetary gear train according to various embodiments of the present invention includes a first, a second, a third, and a fourth planetary gear set PG1, PG2, PG3, and PG4 disposed on a same axis line, an input shaft IS, an output shaft OS, eight rotating shafts TM1 to TM8 that connect respective rotating elements of the first, second, third, and fourth planetary gear sets PG1, PG2, PG3, and PG4 to each other, seven control elements C1 to C4 and B1 to B3, and a transmission housing H.

Further, rotary power input from the input shaft IS is transmitted by an inter-complementation operation of the first, second, third, and fourth planetary gear sets PG1, PG2, PG3, and PG4 to be output through the output shaft OS with rotary speed changed.

The respective simple planetary gear sets are disposed in an order of the second, the first, the third, and the fourth planetary gear set PG2, PG1, PG3, and PG4 starting from an engine side.

The input shaft IS is an input member and rotary power from a crankshaft of an engine is torque-converted through a torque converter to be input into the input shaft IS.

The output shaft OS as an output member is disposed on a same axis line as the input shaft IS and transmits transmitted driving power to a driving shaft through a differential.

The first planetary gear set PG1, which is a single-pinion planetary gear set, includes a first sun gear S1 which is a first rotating element N1, a first planetary carrier PC1 which is a second rotating element N2 and rotatably supports a first pinion P1 which engages externally with the first sun gear S1, and a first ring gear R1 which is a third rotating element N3 and engages internally with the first pinion P1 as rotating elements.

The second planetary gear set PG2, which is a single-pinion planetary gear set, includes a second sun gear S2 which is a fourth rotating element N4, a second planetary carrier PC2 which is a fifth rotating element N5 and rotatably supports a second pinion P2 which engages externally with the second sun gear S2, and a second ring gear R2 which is a sixth rotating element N6 and engages internally with the second pinion P2.

The third planetary gear set PG3, which is a single-pinion planetary gear set, includes a third sun gear S3 which is a seventh rotating element N7, a third planetary carrier PC3 which is an eighth rotating element N8 and rotatably supports a third pinion P3 which engages externally with the third sun gear S3, and a third ring gear R3 which is a ninth rotating element N9 and engages internally with the third pinion P3.

The fourth planetary gear set PG4, which is a single-pinion planetary gear set, includes a fourth sun gear S4 which is a tenth rotating element N10, a fourth planetary carrier PC4 which is a eleventh rotating element N11 and rotatably supports a fourth pinion P4 which engages externally with the fourth sun gear S4, and a fourth ring gear R4 which is a twelfth rotating element N12 and engages internally with the fourth pinion P4.

In the first, second, third, fourth planetary gear sets PG1, PG2, PG3, and PG4, the first rotating element N1 is directly connected with the sixth rotating element N6 and the eighth rotating element N8, the seventh rotating element N7 is directly connected with the eleventh rotating element N11, and the ninth rotating element N9 is directly connected with the tenth rotating element N10, and the planetary gear sets have a total of eight rotating shafts TM1 to TM8.

Configurations of the eight rotating shafts TM1 to TM8 will be described below.

The first rotating shaft TM1 includes the first rotating element N1 (the first sun gear S1), the sixth rotating element N6 (the second ring gear R2), and the eighth rotating element N8 (the third planetary carrier PC3).

The second rotating shaft TM2 includes the second rotating element N2 (the first planetary carrier PC1) and is directly connected with the input shaft IS.

The third rotating shaft TM3 includes the third rotating element N3 (the first ring gear R1).

The fourth rotating shaft TM4 includes the fourth rotating element N4 (the second sun gear S2) and is selectively connected with the second rotating shaft TM2 and a transmission housing H.

The fifth rotating shaft TM5 includes the fifth rotating element N5 (the second planetary carrier PC2) and is selectively connected with the second rotating shaft TM2.

The sixth rotating shaft TM6 includes the seventh rotating element N7 (the third sun gear S3) and the eleventh rotating element N11 (the fourth planetary carrier PC4) and is selectively connected with the third rotating shaft TM3.

The seventh rotating shaft TM7 includes the ninth rotating element N9 (the third ring gear R3) and the tenth rotating element N10 (the fourth sun gear S4) and is selectively connected with the fifth rotating shaft TM5.

The eighth rotating shaft TM8 includes the twelfth rotating element N12 (the fourth ring gear R4) and is selectively connected with the transmission housing H.

In addition, four clutches C1, C2, C3, and C4 which are control elements are disposed at portions selectively connecting the rotating shafts respectively, among the rotating shafts TM1 to TM8.

Further, three brakes B1 to B2 which are other control elements are disposed at portions selectively connecting the transmission housing H and the rotating shafts respectively, among the rotating shafts TM1 to TM8.

Layout positions of the seven control elements C1 to C4 and B1 to B3 will be described below.

The first clutch C1 is interposed between the third rotating shaft TM3 and the sixth rotating shaft TM6 and operates such that the third rotating shaft TM3 and the sixth rotating shaft TM6 selectively operate as one body.

The second clutch C2 is interposed between the second rotating shaft TM2 and the fourth rotating shaft TM4 and operates such that the second rotating shaft TM2 and the fourth rotating shaft TM4 selectively operate as one body.

The third clutch C3 is interposed between the second rotating shaft TM2 and the fifth rotating shaft TM5 and operates such that the second rotating shaft TM2 and the fifth rotating shaft TM5 selectively operate as one body.

The fourth clutch C4 is interposed between the fifth rotating shaft TM5 and the seventh rotating shaft TM7 and operates such that the fifth rotating shaft TM5 and the seventh rotating shaft TM7 selectively operate as one body.

The first brake B1 is interposed between the fourth rotating shaft TM4 and the transmission housing H and operates such that the fourth rotating shaft TM4 can selectively operate as a fixing element.

The second brake B2 is interposed between the fifth rotating shaft TM5 and the transmission housing H and operates such that the fifth rotating shaft TM4 can selectively operate as a fixing element.

The third brake B3 is interposed between the eighth rotating shaft TM8 and the transmission housing H and operates such that the eighth rotating shaft TM8 can selectively operate as a fixing element.

The respective control elements constituted by the first, the second, the third, and the fourth clutch C1, C2, C3, and C4 and the first, the second, and the third brake B1, B2, and B3 as described above may be configured by multiple-disk hydraulic friction joining units which are friction-joined by hydraulic pressure.

FIG. 2 is an operation table for each of transmission steps of respective control elements applied to an exemplary planetary gear train according to the present invention.

As illustrated in FIG. 2, a transmission is performed while three control elements operate in the respective transmission steps, in an exemplary planetary gear train according to the present invention.

In a first forward transmission step D1, the second and the fourth clutch C2 and C4 and the third brake B3 simultaneously operate.

As a result, an input is made into the second rotating shaft TM2 in a state of the second rotating shaft TM2 and the fourth rotating shaft TM4 being connected by an operation of the second clutch C2 and the fifth rotating shaft TM5 and the seventh rotating shaft TM7 being connected by an operation of the fourth clutch C4 and the first forward transmission step D1 is performed and an output is output through the sixth rotating shaft TM6 while the eighth rotating shaft TM8 operates as a fixing element by an operation of the third brake B3.

In a second forward transmission step D2, the third and the fourth clutch C3 and C4 and the third brake B3 simultaneously operate.

As a result, an input is made into the second input shaft TM2 in a state of the fifth rotating shaft TM5 being connected with the second rotating shaft TM2 and the seventh rotating shaft TM7 by an operation of the third and the fourth clutch C3 and C4 and the second forward transmission step D2 is performed and an output is output through the sixth rotating shaft TM6 while the eighth rotating shaft TM8 operates as a fixing element by an operation of the third brake B3.

In a third forward transmission step D3, the second and the third clutch C2 and C3 and the third brake B3 simultaneously operate.

As a result, an input is made into the second input shaft TM2 in a state of the second rotating shaft TM2 being connected with the fourth rotating shaft TM4 and the fifth rotating shaft TM5 by an operation of the second clutch C2 and the third clutch C3 and the third forward transmission step D3 is performed and an output is output through the sixth rotating shaft TM6 while the eighth rotating shaft TM8 operates as a fixing element by an operation of the third brake B3.

In a fourth forward transmission step D4, the third clutch C3 and the first and the third brake B1 and B3 simultaneously operate.

As a result, an input is made into the second input shaft TM2 in a state of the second rotating shaft TM2 and the fifth rotating shaft TM5 being connected by an operation of the third clutch C3 and the fourth forward transmission step D4 is performed and an output is output through the sixth rotating shaft TM6 while the fourth rotating shaft TM4 and the eighth rotating shaft TM8 operate as fixing elements by an operation of the first brake B1 and the third brake B3.

In a fifth forward transmission step D5, the first and the third clutch C1 and C3 and the third brake B3 simultaneously operate.

As a result, an input is made into the second input shaft TM2 in a state of the third rotating shaft TM3 and the sixth rotating shaft TM6 being connected by an operation of the first clutch C1 and the second rotating shaft TM2 and the fifth rotating shaft TM5 being connected by an operation of the third clutch C3 and the fifth forward transmission step D5 is performed and an output is output through the sixth rotating shaft TM6 while the eighth rotating shaft TM8 operates as a fixing element by an operation of the third brake B3.

In a sixth forward transmission step D6, the first and third clutch C1 and C3 and the first brake B1 simultaneously operate.

As a result, an input is made into the second input shaft TM2 in a state of the third rotating shaft TM3 and the sixth rotating shaft TM6 being connected by an operation of the first clutch C1 and the second rotating shaft TM2 and the fifth rotating shaft TM5 being connected by an operation of the third clutch C3 and the sixth forward transmission step D6 is performed and an output is output through the sixth rotating shaft TM6 while the fourth rotating shaft TM4 operates as a fixing element by an operation of the first brake B1.

In a seventh forward transmission step D7, the first, the third, and the fourth clutch C1, C3, and C4 simultaneously operate.

As a result, an input is made into the second input shaft TM2 in a state of the third rotating shaft TM3 and the sixth rotating shaft TM6 being connected by an operation of the first clutch C1 and the fifth rotating shaft TM5 being connected with the second rotating shaft TM2 and the seventh rotating shaft TM7 by an operation of the third and the fourth clutch C3 and C4 and the seventh forward transmission step D7 in which rotary power received by the second rotating shaft TM2 is intactly output through the sixth rotating shaft TM6, is performed while all of the first, second, third, and fourth planetary gear sets PG1, PG2, PG3, and PG4 are serially connected.

In an eighth forward transmission step D8, the first and the fourth clutch C1 and C4 and the second brake B2 simultaneously operate.

As a result, an input is made into second input shaft TM2 in a state of the third rotating shaft TM3 and the sixth rotating shaft TM6 being connected by an operation of the first clutch C1 and the fifth rotating shaft TM5 and the seventh rotating shaft TM7 being connected by an operation of the fourth clutch C4 and the eighth forward transmission step D8 is performed and an output is output through the sixth rotating shaft TM6 while the fifth rotating shaft TM5 and the seventh rotating shaft TM7 operate as fixing elements by an operation of the fourth clutch C4 and the first brake B2.

In a ninth forward transmission step D9, the first clutch C1 and the first and the second brake B1 and B2 simultaneously operate.

As a result, an input is made into the second input shaft TM2 in a state of the third rotating shaft TM3 and the sixth rotating shaft TM6 being connected by an operation of the first clutch C1 and the ninth forward transmission step D9 is performed and an output is output through the sixth rotating shaft TM6 while the fourth rotating shaft TM4 and the fifth rotating shaft TM5 are fixed by an operation of the first and the second brake B1 and B2, the entire second planetary gear set PG2 is fixed, and thereby the first rotating shaft TM1 connected therewith operates as a fixing element.

In a tenth forward transmission step D10, the first and the second clutch C1 and C2 and the second brake B2 simultaneously operate.

As a result, an input is made into the second rotating shaft TM2 in a state of the third rotating shaft TM3 and the sixth rotating shaft TM6 being connected by an operation of the first clutch C1 and the second rotating shaft TM2 and the fourth rotating shaft TM4 being connected by an operation of the second clutch C2 and the tenth forward transmission step D10 is performed and an output is output through the sixth rotating shaft TM6 while the fifth rotating shaft TM5 operates as a fixing element by an operation of the second brake B2.

In a reverse transmission step REV, the second clutch C2 and the second and the third brake B2 and B3 simultaneously operate.

As a result, an input is made into the second input shaft TM2 in a state of the second rotating shaft TM2 and the fourth rotating shaft TM4 being connected by an operation of the second clutch C2 and the reverse transmission step REV is performed and an output is output through the sixth rotating shaft TM6 while the fifth and the eighth rotating shaft TM5 and TM8 operate as fixing elements by an operation of the second and the third brake B2 and B3.

As described above, in the planetary gear train according to various embodiments of the present invention, four planetary gear sets PG1, PG2, PG3, and PG4 may implement the forward at least 10-speed and reverse 1-speed transmission steps through the operation-control of four clutches C1, C2, C3, and C4 and three brakes B1, B2, and B3.

Further, drivability such as acceleration before and after a speed change and rhythmic feeling of engine speed can be improved because linearity of step ratios between transmission stages is secured even though step ratios between forward 6/7, 7/8, 8/9, and 9/10 transmission steps are less than 1.2.

In addition, operation efficiency of an engine can be maximized because an entire gear ratio is secured to be equal to or greater than 9.0.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
   an input shaft always receiving rotary power of an external power source;
   an output shaft outputting the rotary power with rotary speed changed;
   a first planetary gear set including a first, a second, and a third rotating element;

a second planetary gear set including a fourth, a fifth, and a sixth rotating element;
a third planetary gear set including a seventh, an eighth, and a ninth rotating element;
a fourth planetary gear set including a tenth, a eleventh, and a twelfth rotating element; and
seven control elements disposed between one of the rotating elements and another of the rotating elements or the input shaft, between one of the rotating elements and the output shaft, or between one of the rotating elements and a transmission housing,
wherein the input shaft is directly connected with the second rotating element,
the output shaft is directly connected with the eleventh rotating element,
the first rotating element is directly connected with the sixth rotating element,
the first rotating element is directly connected with the eighth rotating element,
the seventh rotating element is directly connected with the eleventh rotating element,
the ninth rotating element is directly connected with the tenth rotating element, and
the output shaft is selectively connected with the third rotating element, such that the output shaft and the third rotating elements rotate at a same speed when connected each other, and
wherein the planetary gear train implements transmission steps of at least ten forward speeds and at least one reverse speed, each of which is achieved by operating corresponding three control elements among the seven control elements.

2. The planetary gear train of claim 1, wherein:
the fourth rotating element is selectively connected with the transmission housing,
the fifth rotating element is selectively connected with the transmission housing,
the twelfth rotating element is selectively connected with the transmission housing,
the input shaft is selectively connected with the fourth rotating element and the fifth rotating element respectively, and
the ninth rotating element is selectively connected with the fifth rotating element.

3. The planetary gear train of claim 2, wherein the seven control elements comprise:
a first clutch selectively connecting the output shaft and the third rotating element;
a second clutch selectively connecting the input shaft and the fourth rotating element;
a third clutch selectively connecting the input shaft and the fifth rotating element;
a fourth clutch selectively connecting the ninth rotating element and the fifth rotating element;
a first brake selectively connecting the fourth rotating element and the transmission housing;
a second brake selectively connecting the fifth rotating element and the transmission housing; and
a third brake selectively connecting the twelfth rotating element and the transmission housing.

4. The planetary gear train of claim 1, wherein:
the first, the second, and the third rotating element of the first planetary gear set are a sun gear, a planetary carrier, and a ring gear respectively,
the fourth, the fifth, and the sixth rotating element of the second planetary gear set are a sun gear, a planetary carrier, a ring gear respectively,
the seventh, the eighth, and the ninth rotating element of the third planetary gear set are a sun gear, a planetary carrier, and a ring gear respectively, and
the tenth, the eleventh, and the twelfth rotating element of the fourth planetary gear set are a sun gear, a planetary carrier, and a ring gear respectively.

5. A planetary gear train of an automatic transmission for a vehicle comprising:
an input shaft receiving rotary power of an engine;
an output shaft outputting the rotary power with rotary speed changed;
a first planetary gear set including a first, a second, and a third rotating element;
a second planetary gear set including a fourth, a fifth, and a sixth rotating element;
a third planetary gear set including a seventh, an eighth, and a ninth rotating element;
a fourth planetary gear set including a tenth, a eleventh, and a twelfth rotating element;
seven control elements disposed between a corresponding pair among the input shaft, the output shaft, the rotating elements, and a transmission housing,
a first rotating shaft including the first rotating element, the sixth rotating element, and the eighth rotating element;
a second rotating shaft including the second rotating element and directly connected with the input shaft;
a third rotating shaft including the third rotating element;
a fourth rotating shaft including the fourth rotating element and selectively connected with the second rotating shaft and the transmission housing;
a fifth rotating shaft including the fifth rotating element and selectively connected with the second rotating shaft;
a sixth rotating shaft including the seventh rotating element and the eleventh rotating element, directly connected with the output shaft, and selectively connected with the third rotating shaft;
a seventh rotating shaft including the ninth rotating element and the tenth rotating element and selectively connected with the fifth rotating shaft; and
an eighth rotating shaft including the twelfth rotating element and selectively connected with the transmission housing.

6. The planetary gear train of claim of claim 5, wherein:
the first planetary gear set is a single-pinion planetary gear set, the first rotating element is a first sun gear, the second rotating element is a first planetary carrier, and the third rotating element is a first ring gear,
wherein the second planetary gear set is a single-pinion planetary gear set, the fourth rotating element is a second sun gear, the fifth rotating element is a second planetary carrier, and the sixth rotating element is a second ring gear,
wherein the third planetary gear set is a single-pinion planetary gear set, the seventh rotating element is a third sun gear, the eighth rotating element is a third planetary carrier, and the ninth rotating element is a third ring gear, and
wherein the fourth planetary gear set is a single-pinion planetary gear set, the tenth rotating element is a fourth sun gear, the eleventh rotating element is a fourth planetary carrier, and the twelfth rotating element is a fourth ring gear.

7. The planetary gear train of claim 5, wherein the four planetary gear sets are disposed in an order of the second, the first, the third, and the fourth planetary gear set starting from an engine side.

8. The planetary gear train of claim 5, wherein the seven control elements comprise:
a first clutch selectively connecting the output shaft and the third rotating element;
a second clutch selectively connecting the input shaft and the fourth rotating element;
a third clutch selectively connecting the input shaft and the fifth rotating element;
a fourth clutch selectively connecting the ninth rotating element and the fifth rotating element;
a first brake selectively connecting the fourth rotating element and the transmission housing;
a second brake selectively connecting the fifth rotating element and the transmission housing; and
a third brake selectively connecting the twelfth rotating element and the transmission housing.

9. The planetary gear train of claim 8, wherein transmission stages implemented by selectively operating the six control elements include:
a first forward transmission stage implemented by simultaneously operating the second and the fourth clutches and the third brake;
a second forward transmission stage implemented by simultaneously operating the third and the fourth clutches and the third brake;
a third forward transmission stage implemented by simultaneously operating the second and the third clutches and the third brake;
a fourth forward transmission stage implemented by simultaneously operating the third clutches and the first and the third brakes;
a fifth forward transmission stage implemented by simultaneously operating the first and the third clutches and the third brake;
a sixth forward transmission stage implemented by simultaneously operating the first and the third clutches and the first brake;
a seventh forward transmission stage implemented by simultaneously operating the first, the third, and the fourth clutches;
an eighth forward transmission stage implemented by simultaneously operating the first and the fourth clutches and the second brake;
a ninth forward transmission stage implemented by simultaneously operating the first clutch and the first and the second brakes;
a tenth forward transmission stage implemented by simultaneously operating the first and the second clutches and the second brake; and
a reverse transmission stage implemented by simultaneously operating the second clutch and the second and the third brakes.

10. A planetary gear train of an automatic transmission for a vehicle comprising:
an input shaft receiving rotary power of an engine;
an output shaft outputting the rotary power with rotary speed changed;
a first planetary gear set including a first, a second, and a third rotating element;
a second planetary gear set including a fourth, a fifth, and a sixth rotating element;
a third planetary gear set including a seventh, an eighth, and a ninth rotating element;
a fourth planetary gear set including a tenth, a eleventh, and a twelfth rotating element;
a first rotating shaft including the first rotating element, the sixth rotating element, and the eighth rotating element;
a second rotating shaft including the second rotating element and directly connected with the input shaft;
a third rotating shaft including the third rotating element;
a fourth rotating shaft including the fourth rotating element and selectively connected with the second rotating shaft and a transmission housing;
a fifth rotating shaft including the fifth rotating element and selectively connected with the second rotating shaft;
a sixth rotating shaft including the seventh rotating element and the eleventh rotating element, directly connected with the output shaft, and selectively connected with the third rotating shaft;
a seventh rotating shaft including the ninth rotating element and the tenth rotating element and selectively connected with the fifth rotating shaft;
an eighth rotating shaft including the twelfth rotating element and selectively connected with the transmission housing;
a first clutch selectively connecting the third rotating shaft and the sixth rotating shaft;
a second clutch selectively connecting the second rotating shaft and the fourth rotating shaft;
a third clutch selectively connecting the second rotating shaft and the fifth rotating shaft;
a fourth clutch selectively connecting the fifth rotating shaft and the seventh rotating shaft;
a first brake selectively connecting the fourth rotating shaft with the transmission housing;
a second brake selectively connecting the fifth rotating shaft with the transmission housing; and
a third brake selectively connecting the eighth rotating shaft with the transmission housing.

11. The planetary gear train of claim 10, wherein:
the first planetary gear set is a single-pinion planetary gear set, the first rotating element is a first sun gear, the second rotating element is a first planetary carrier, and the third rotating element is a first ring gear,
wherein the second planetary gear set is a single-pinion planetary gear set, the fourth rotating element is a second sun gear, the fifth rotating element is a second planetary carrier, and the sixth rotating element is a second ring gear,
wherein the third planetary gear set is a single-pinion planetary gear set, the seventh rotating element is a third sun gear, the eighth rotating element is a third planetary carrier, and the ninth rotating element is a third ring gear, and
wherein the fourth planetary gear set is a single-pinion planetary gear set, the tenth rotating element is a fourth sun gear, the eleventh rotating element is a fourth planetary carrier, and the twelfth rotating element is a fourth ring gear.

12. The planetary gear train of claim 11, wherein the four planetary gear sets are disposed in an order of the second, the first, the third, and the fourth planetary gear set starting from an engine side.

13. The planetary gear train of claim 10, wherein transmission stages implemented by selectively operating the first, the second, the third, and the fourth clutch and the first, the second, and the third brake elements include:

a first forward transmission stage implemented by simultaneously operating the second and the fourth clutches and the third brake;
a second forward transmission stage implemented by simultaneously operating the third and the fourth clutches and the third brake;
a third forward transmission stage implemented by simultaneously operating the second and the third clutches and the third brake;
a fourth forward transmission stage implemented by simultaneously operating the third clutches and the first and the third brakes;
a fifth forward transmission stage implemented by simultaneously operating the first and the third clutches and the third brake;
a sixth forward transmission stage implemented by simultaneously operating the first and the third clutches and the first brake;
a seventh forward transmission stage implemented by simultaneously operating the first, the third, and the fourth clutches;
an eighth forward transmission stage implemented by simultaneously operating the first and the fourth clutches and the second brake;
a ninth forward transmission stage implemented by simultaneously operating the first clutch and the first and the second brakes;
a tenth forward transmission stage implemented by simultaneously operating the first and the second clutches and the second brake; and
a reverse transmission stage implemented by simultaneously operating the second clutch and the second and the third brakes.

14. A planetary gear train of an automatic transmission for a vehicle comprising:
an input shaft receiving rotary power of an engine;
an output shaft outputting the rotary power with rotary speed changed;
a first planetary gear set, which is a single-pinion planetary gear set, including a first sun gear, a first planetary carrier, and a first ring gear;
a second planetary gear set, which is a single-pinion planetary gear set, including a second sun gear, a second planetary carrier, and a second ring gear;
a third planetary gear set, which is a single-pinion planetary gear set, including a third sun gear, a third planetary carrier, and a third ring gear;
a fourth planetary gear set, which is a single-pinion planetary gear set, including a fourth sun gear, a fourth planetary carrier, and a fourth ring gear;
a first rotating shaft including the first sun gear, the second ring gear, and the third planetary carrier;
a second rotating shaft including the first planetary carrier and directly connected with the input shaft;
a third rotating shaft including the first ring gear;
a fourth rotating shaft including the second sun gear and selectively connected with the second rotating shaft and a transmission housing;
a fifth rotating shaft including the second planetary carrier and selectively connected with the second rotating shaft;
a sixth rotating shaft including the third sun gear and the fourth planetary carrier, directly connected with the output shaft, and selectively connected with the third rotating shaft;
a seventh rotating shaft including the third ring gear and the fourth sun gear and selectively connected with the fifth rotating shaft;
an eighth rotating shaft including the fourth ring gear and selectively connected with the transmission housing; and
seven control elements each of which selectively connects a corresponding pair among the input shaft, the output shaft, the rotating shafts, and the transmission housing respectively.

15. The planetary gear train of claim 14, wherein the four planetary gear sets are disposed in an order of the second, the first, the third, and the fourth planetary gear set starting from an engine side.

16. The planetary gear train of claim 14, further comprising:
a first clutch selectively connecting the first ring gear and the third sun gear;
a second clutch selectively connecting the first planetary carrier and the second sun gear;
a third clutch selectively connecting the first planetary carrier and the second planetary carrier;
a fourth clutch selectively connecting the third ring gear and the second planetary carrier;
a first brake selectively connecting the second sun gear with the transmission housing;
a second brake selectively connecting the second planetary carrier with the transmission housing; and
a third brake selectively connecting the fourth ring gear with the transmission housing.

17. The planetary gear train of claim 16, wherein transmission stages implemented by selectively operating the six control elements include:
a first forward transmission stage implemented by simultaneously operating the second and the fourth clutches and the third brake;
a second forward transmission stage implemented by simultaneously operating the third and the fourth clutches and the third brake;
a third forward transmission stage implemented by simultaneously operating the second and the third clutches and the third brake;
a fourth forward transmission stage implemented by simultaneously operating the third clutches and the first and the third brakes;
a fifth forward transmission stage implemented by simultaneously operating the first and the third clutches and the third brake;
a sixth forward transmission stage implemented by simultaneously operating the first and the third clutches and the first brake;
a seventh forward transmission stage implemented by simultaneously operating the first, the third, and the fourth clutches;
an eighth forward transmission stage implemented by simultaneously operating the first and the fourth clutches and the second brake;
a ninth forward transmission stage implemented by simultaneously operating the first clutch and the first and the second brakes;
a tenth forward transmission stage implemented by simultaneously operating the first and the second clutches and the second brake; and
a reverse transmission stage implemented by simultaneously operating the second clutch and the second and the third brakes.

* * * * *